United States Patent

Tsuboi et al.

[15] 3,647,054
[45] Mar. 7, 1972

[54] PROCESS FOR PURIFYING XYLYLENEDIAMINE BY ALKALINE AGENT ADDITION AND DISTILLATION

[72] Inventors: Yukio Tsuboi; Yoshio Ueda; Tazuo Ota; Mikio Yoneoka, all of Niigata, Japan

[73] Assignee: Japan Gas-Chemical Company, Inc., Tokyo, Japan

[22] Filed: Apr. 2, 1970

[21] Appl. No.: 25,264

[52] U.S. Cl. ............................203/29, 203/33, 203/36, 203/37, 203/38, 203/53, 203/56, 203/63, 203/65, 203/95, 260/570.9
[51] Int. Cl. .................................B01d 3/34, C07c 87/28
[58] Field of Search ................203/56, 53, 33, 29, 36, 37, 203/38, 95-97, 63, 65; 260/570.9

[56] References Cited

UNITED STATES PATENTS 2,773,902  12/1956  Heaton .........................260/570.9
2,900,309  8/1959   Valentine ..........................203/64
3,009,957  11/1961  Adam ...........................260/570.9

FOREIGN PATENTS OR APPLICATIONS 810,530   3/1959  Great Britain ..................260/570.9
8,719/63  6/1963  Japan ..........................260/570.9

Primary Examiner—Wilbur L. Bascomb, Jr.
Attorney—Cushman, Darby & Cushman

[57] ABSTRACT

A high-purity xylylenediamine containing particularly neither phthalonitrile nor cyanobenzylamine is produced from the raw xylylenediamine obtained by the hydrogenation of a phthalonitrile, by heating said raw xylylenediamine in the presence of water or an alcohol after the addition of an alkaline agent such as alkali metals, alkaline earth metals, or alkaline compounds thereof, and then distilling the mixture to recover said high-purity xylylenediamine. The high-purity xylylenediamine obtained is particularly suitable for the production of polyamide fibers.

9 Claims, 1 Drawing Figure

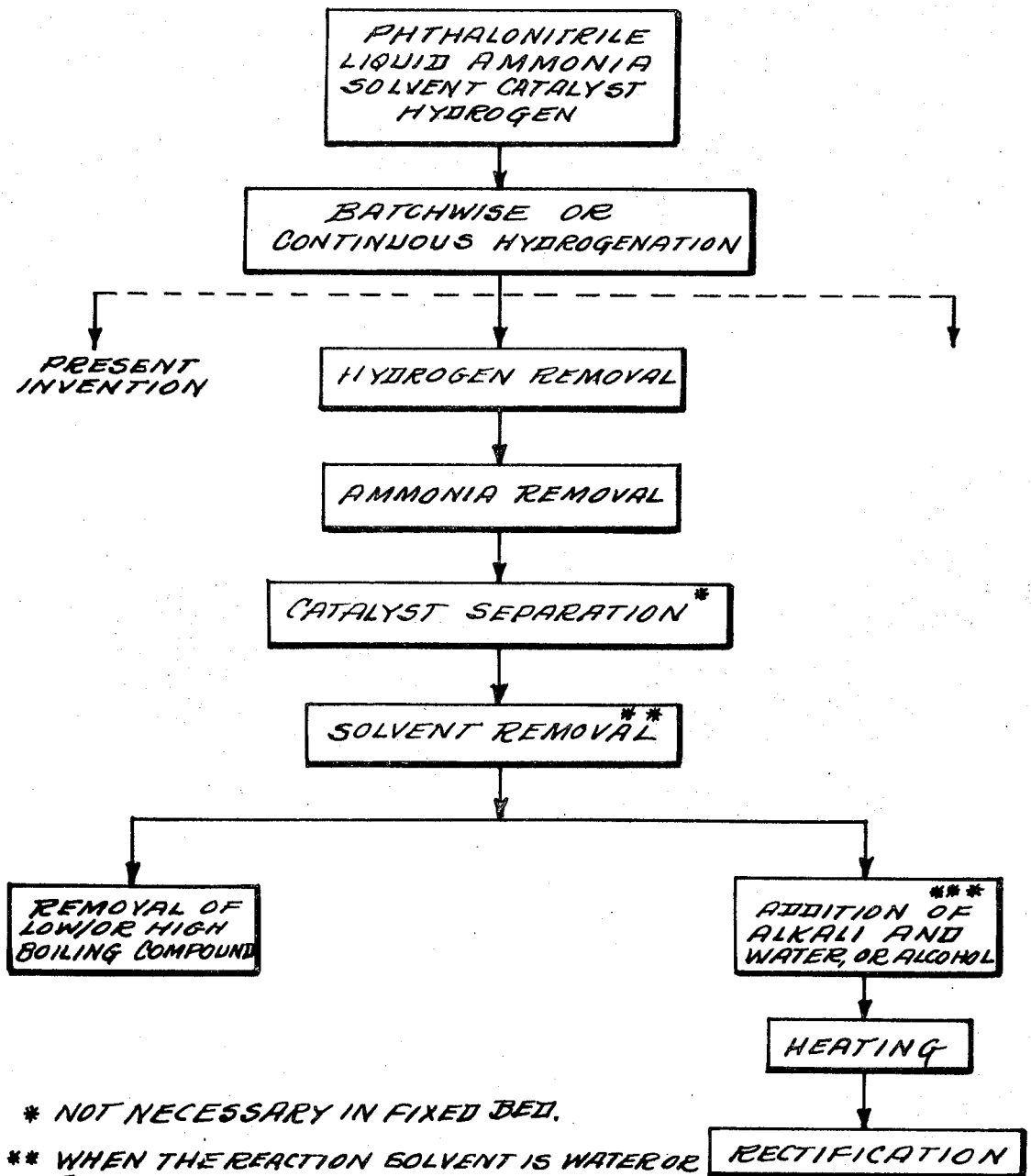

PROCESS FOR PURIFYING XYLYLENEDIAMINE BY ALKALINE AGENT ADDITION AND DISTILLATION

The present invention relates to a process for purifying xylylenediamines such as m-xylylenediamine and p-xylylenediamine. More particularly, it relates to a process for purifying xylylenediamines, which comprises heating raw xylylenediamines in water or in an alcohol in the presence of minute amounts of an alkaline agent, and then subjecting to distillation to recover high purity xylylenediamines.

Xylylenediamines are generally manufactured by the hydrogenation of phthalonitriles. In this procedure other amines such as secondary-, tertiary-, or poly-amines are known to be formed simultaneously as byproducts.

Xylylenediamines are generally used along with dicarboxylic acids as the starting material for manufacturing nylon salts which in turn are used in the production of polyamide fibers. In case there are contained in the xylylenediamine, beside above-mentioned amines and polyamines, minute amounts of cyano-radical-containing impurities such as unreacted phthalonitrile and cyanobenzylamine formed by the partial reduction thereof, said impurities tend to discolor the nylon salt and the polyamide, and, moreover, they cause the decrease in the dyeability of the fiber and disturb both of the reaction of formation of the nylon salt and the polymerization of the nylon salt to the polyamide. Nylon salts and polyamides are generally used without purification, and even if tried to purify, they are difficult to decolorize when once discolored with said impurities. Therefore, xylylenediamines and dicarboxylic acids themselves are required to be in a sufficiently pure state.

The production of such a high-purity xylylenediamine has been considered to be achieved by (A) selecting a proper mode and suitable conditions of the reaction which enable the increase in the yield of xylylenediamine with the minimum formation of byproducts, or by (B) adopting a proper purification process capable of providing xylylenediamine of a required high purity, or by (C) combining both ways (A) and (B).

However, a literature survey reveals that the majority of efforts to obtain the high purity xylylenediamine had been directed to the above-mentioned way (A) which is mainly concerned with the improvement of yield with the minimum byproducts. In the hydrogenation of phthalonitriles to xylylenediamines, nickel or cobalt has been used as a catalyst. For example, in U.S. Pat. No. 2,773,902 and in British Pat. No. 810,530, cobalt or nickel was used as a catalyst in the presence of a large amount of liquid ammonia at high temperature and high pressure. In Japanese Pat. No. 8719/63, Raney nickel or Raney cobalt was used as a catalyst in the presence of alkalis in an organic solvent at room temperature to suppress the formation of some secondary or tertiary amines as byproducts. There is also a report concerning the effect of solvents upon the suppression of byproduct formation [Tr. Inst. Khim. Nauk. Akad. Nauk. Kaz., USSR, 7, 68 (1961)]The present inventors had also investigated on the synthesis of xylylenediamines from phthalonitriles using conventional Raney nickel or cobalt as a catalyst. As a result it was confirmed that when a phthalonitrile had been hydrogenated in an organic solvent such as toluene or methanol in the presence of a caustic alkali at a temperature of 50° to 70° C., the corresponding xylylenediamine was obtained in a yield of 50 to 60 percent on the basis of phthalonitrile, with the formation of considerable quantities of resinous matters which rendered the process disadvantageous. Further, it was confirmed that when liquid ammonia had been used in place of the caustic alkali and the hydrogenation had been allowed to proceed in the homogeneous liquid phase at 70° to 100° C., the xylylenediamine was obtained in a yield of 85 to 90 percent on the basis of phthalonitrile, which proved the advantage of using liquid ammonia in the synthesis of xylylenediamines from phthalonitriles by high-pressure hydrogenation in the liquid phase to increase the yield of xylylenediamines on the basis of phthalonitriles and to suppress the formation of byproducts.

As mentioned above, it was possible to improve the yield of xylylenediamines and suppress the formation of byproducts to a certain extent by selecting a proper mode and suitable conditions of hydrogenation. However, the xylylenediamines separated by careful distillation from some impurities in the reaction liquid mixture was generally found to be never sufficiently pure as required for the starting material in the manufacture of a polyamide fiber.

The present inventors have confirmed that the complete removal of the unreacted phthalonitrile and byproduced cyanobenzylamine was impossible by only distillation. The turbidity sometimes appeared in the distillate was found to be due to the presence of unreacted phthalonitrile, and the turbidity itself was readily removable by filtration and other means. However, the phthalonitrile and cyanobenzylamine entrained by xylylenediamine and dissolved in the distillate could not be removed.

The difficulty of obtaining high purity xylylenediamine by distillation seemed to be caused by the entrainment of phthalonitrile due to the subliming tendency of the latter over a wide range of temperatures. Further, the close proximity of the boiling points of cyanobenzylamine and xylylenediamine made difficult the removal of cyanobenzylamine from xylylenediamine by distillation.

The present inventors have now found that when the raw xylylenediamine containing as impurities unreacted phthalonitrile and byproduced cyanobenzylamine was heated in a reaction medium after addition of an alkaline agent, the unreacted phthalonitrile, byproduced cyanobenzylamine and other impurities may be removed almost completely by distillation, to obtain an extremely pure xylylenediamine as the distillate. Based on this finding the present invention has been accomplished.

The object of the present invention is to provide a process for purifying xylylenediamine to obtain easily and effectively from raw xylylenediamine an extremely pure xylylenediamine containing substantially neither unreacted phthalonitrile nor byproduced cyanobenzylamine. Accordingly, the present invention is the purification process of xylylenediamines characterized in that the raw xylylenediamines obtained by hydrogenating phthalonitriles are heated in the presence of water or an alcohol after adding thereto an alkaline agent, and then distilled to obtain the purified xylylenediamines.

The raw xylylenediamines to be purified by the present process are raw m- and/or raw p-xylenediamines which were obtained by the hydrogenation of phthalonitriles and contain as impurities at least unreacted phthalonitriles or byproduced cyanobenzylamines regardless the reaction conditions under which said raw xylylenediamines had been prepared. However, since it is a matter of course that a raw xylylenediamine containing less quantities of unreacted phthalonitrile and/or cyanobenzylamine is more desirable in the present process, such raw xylylenediamine as that obtained by hydrogenating phthalonitrile with a Raney nickel or cobalt in the homogeneous liquid phase comprising liquid ammonia and an organic solvent is most preferable. The term herein referred to as "raw xylylenediamine" includes the reaction mixture obtained by the hydrogenation of phthalonitrile and the partially purified xylylenediamines obtained therefrom by conventional distillation, both of which contain unreacted phthalonitrile and/or byproduced cyanobenzylaimine.

The content of phthalonitrile and cyanobenzylamine in the raw xylylenediamine can be determined by gas chromatography or thin layer chromatography using ninhydrin. However, when said determination is made on the hydrogenated products of phthalonitriles, polyamines and other resinous matters tend to interfere with the determination. In such a case the determination can be made indirectly on the distilled sample, because upon distillation almost all the unreacted phthalonitrile and/or byproduced cyanobenzylamine contained in said hydrogenated products are carried over with xylylenediamine into the distillate.

The alkaline agent used in the present invention is a substance which shows alkalinity when dissolved in water. Examples are alkali metals such as metallic sodium and potassium, alkaline earth metals such as metallic calcium and magnesium, or hydroxides, oxides, carbonates, and alcoholates of alkali metals and alkaline earth metals. They are used each alone or in mixtures.

The amount of said alkaline agent to be added is 0.1 to 5 gram atoms, preferably 0.5 to 3 gram atoms, calculated on the basis of an alkali metal or alkaline earth metal in the alkaline agent, per 1 gram-mole of the combined amount of phthalonitrile and cyanobenzylamine contained in the raw xylylenediamine. When the proportion of an alkaline agent falls below 0.1 gram atom, the unreacted phthalonitrile and byproduced cyanobenzylamine cannot be removed completely, while the addition of more than 5 gram atoms is only wasteful.

The alkaline agent is added as it is or as a solution or suspension in a suitable medium. In case the raw xylylenediamine already contains the same medium as that to be used in the present process, the alkaline agent may be added as it is or in admixture with said medium. On the other hand, in case the raw xylylenediamine is free from the same medium as that to be added in the present process, the alkaline agent is used together with said medium of the present process.

The medium used in the present process is water or a monohydric alcohol. Examples of said alcohol include lower aliphatic alcohols such as methanol, ethanol, and propanol; and aromatic alcohols such as benzyl alcohol. The amount of said medium used is preferably not less than three times the weight of an alkaline agent to be added.

Although said amount of the medium is not critical and can be selected generally at the convenience of addition of the alkaline agent, the contact of the alkaline agent with phthalonitrile and/or cyanobenzylamine becomes insufficient when said amount falls below three times. On the other hand, as the amount of alcohol increases the contact becomes better, while the consumption of thermal energy in the subsequent removal of the medium becomes larger.

The advantageous effect of the alkaline agent on the almost complete removal of unreacted phthalonitrile and byproduced cyanobenzylamine can be manifested only when said agent is added to the raw xylylenediamine and the mixture was heated in the presence of water or an alcohol prior to the distillation; the addition of said alkaline agent to the hydrogenating system comprising phthalonitrile is ineffective.

The conditions under which the raw xylylenediamine is heated after the addition of an alkaline agent are as follows:

The heating temperature is 65° to 180° C., preferably 70° to 150° C. Heating at temperatures lower than 65° C. is not sufficiently effective in removing phthalonitrile and/or cyanobenzylamine, while heating at temperatures higher than 180° C. tends to decompose xylylenediamines. The period of heating is generally 30 to 300 minutes, preferably 60 to 180 minutes. The heating periods shorter than 30 minutes are not sufficient to remove substantially all the phthalonitrile and cyanobenzylamine, while the heating for more than 300 minutes is not only unnecessary but also undesirable, particularly at high temperatures, owing to the possible decomposition of xylylenediamines.

The heating is preferably effected with shutting off oxygen or air. Thus, the heating is effected under total reflux, or in a stream of an inert gas such as nitrogen. When the heating is effected with respect to the raw xylidenediamine as it is after synthesis thereof, which has been added with alkaline agent, it may be carried out in the stripping stage of removing the medium present. The heating may be carried out under reduced, ordinary, or superatmospheric pressures.

In the present process, by the action of alkaline agents the unreacted phthalonitriles and byproduced cyanobenzylamines contained in raw xylylenediamines seem to be converted respectively into a less sublimable compound and a high-boiling compound to be easily removed from xylylenediamines upon distillation.

The present invention may be carried out in a batch wise or a continuous method.

Pure xylylenediamines are obtained by conventional distillation subsequent to said heating.

According to the present invention, it has become possible to remove substantially all the unreacted phthalonitrile and byproduced cyanobenzylamines contained in raw xylylenediamines, to obtain extremely high purity xylylenediamines specifically suitable as the starting material in manufacturing polyamide fibers.

The single FIGURE of the drawings is a schematic diagram of the process of the invention.

EXAMPLE 1

12.8 grams (0.1 mole) of isophthalonitrile, 20 ml. of methanol, 20 ml. of liquid ammonia, and 2 g. of Raney nickel were placed in a 100 ml. autoclave. After being charged with hydrogen to a pressure of 200 atm., the autoclave was shaken at a temperature of 70° C. Upon completion of the absorption of hydrogen, which required 30 minutes, the autoclave was cooled to room temperature, and the pressure was released to purge off hydrogen and ammonia. After being freed from the catalyst by centrifuging, the reaction mixture was subjected to stripping treatment under ordinary pressure to remove the methanol, and then further distilled under reduced pressure while being passed with a stream of nitrogen, to obtain 11.8 g. of a fraction boiling at 142° to 143° C./14 mm.Hg and containing m-xylenediamine as the principal ingredient. The fraction was analyzed by means of gas chromatography. 0.2 percent by weight of isophthalonitrile and 2.1 percent by weight of 3-cyanobenzylamine as the impurities were found in the fraction.

Hydrogenation of isophthalonitrile was repeated in the same manner as above-mentioned. After being freed from hydrogen, ammonia, catalyst, and methanol, the reaction mixture was added with 1 g. of a methanol solution containing 10 percent by weight of potassium hydroxide, and heated at 65° C. for 120 minutes. After the removal of methanol by distillation, the mixture was distilled under reduced pressure to obtain 12.5 g. of a clear fraction boiling at 142° to 143° C./14 mm.Hg. The fraction was analyzed by means of thin layer chromatography using ninhydrin. Neither isophthalonitrile nor 3-cyanobenzylamine was detected.

EXAMPLE 2

The hydrogenation procedure of Example 1 was repeated. After being freed from hydrogen, ammonia, catalyst, and methanol, the reaction mixture was added with 1 g. of an aqueous solution containing 5 percent by weight of lithium hydroxide, and heated at 100° C. for 90 minutes. After the removal of water by distillation, the mixture was distilled under reduced pressure to obtain 12.6 g. of a fraction boiling at 142° to 143° C./14 mm.Hg. The fraction was analyzed by means of thin layer chromatography using ninhydrin. Neither isophthalonitrile nor 3-cyanobenzylamine was detected.

EXAMPLE 3

The hydrogenation procedure of Example 1 was repeated. After being freed from hydrogen, ammonia, catalyst, and methanol, the reaction mixture was added with 0.11 g. of calcium oxide suspended in 1 g. of water, and heated at 100° C. for about 120 minutes. After the removal of water by distillation, the mixture was distilled under reduced pressure to obtain 12.4 g. of a clear fraction boiling at 142° to 143° C./14 mm.Hg. The fraction was analyzed by means of thin layer chromatography using ninhydrin. Neither isophthalonitrile nor 3-cyanobenzylamine was detected.

EXAMPLE 4

The hydrogenation procedure of Example 1 was repeated. After being freed from hydrogen, ammonia, catalyst, and methanol, the reaction mixture was added with 0.11 g. of magnesium hydroxide suspended in 1 g. of water, and heated at 100° C. for about 180 minutes. After the removal of water by distillation, the mixture was distilled under reduced pressure to obtain 12.3 g. of a clear fraction boiling at 142° to 143° C./14 mm.Hg. The fraction was analyzed by means of thin layer chromato-graphy using ninhydrin. Neither isophthalonitrile nor 3-cyanobenzylamine was detected.

EXAMPLE 5

The hydrogenation procedure of Example 1 was repeated. After being freed from hydrogen, ammonia, catalyst, and methanol, the reaction mixture was added with 0.05 g. of lithium oxide suspended in 1 g. of water, and heated at 100° C. for about 120 minutes. After the removal of water by distillation, the mixture was distilled under reduced pressure to obtain 12.2 g. of a clear fraction boiling at 142° to 143° C./14 mm.Hg. The fraction was analyzed by thin layer chromatography using ninhydrin. Neither isophthalonitrile nor 3-cyanobenzylamine was detected.

EXAMPLE 6

The hydrogenation procedure of Example 1 was repeated. After being freed from hydrogen, ammonia, catalyst, and methanol, the reaction mixture was added with 0.5 g. of an aqueous solution containing 30 percent by weight of potassium carbonate, and heated at 100° C. for about 90 minutes. After the removal of water by distillation, the mixture was distilled under reduced pressure to obtain 12.9 g. of a clear fraction boiling at 142° to 143° C./14 mm.Hg. The fraction was analyzed by thin layer chromatography. Neither isophthalonitrile nor 3-cyanobenzylamine was detected.

EXAMPLE 7

12.8 Grams (0.1 mole) of terephthalonitrile, 20 ml. of toluene, 20 ml. of liquid ammonia and 2 g. of Raney cobalt were placed in a 100 ml. autoclave. After being charged with hydrogen to a pressure of 200 atm., the autoclave was shaken at 80° C. Upon completion of the absorption of hydrogen, which required 35 minutes, the autoclave was cooled to room temperature, and the pressure was released to purge off hydrogen and ammonia. After being freed from the catalyst by centrifuging, the reaction mixture was subjected to stripping treatment under ordinary pressure to remove the toluene, and then further distilled under reduced pressure to obtain 11.7 g. of a fraction boiling at 148° to 149° C./14 mm.Hg and containing p-xylylenediamine as the principal ingredient. The fraction was analyzed by gas chromatography, and 0.3 percent by weight of terephthalonitrile and 2.5 percent by weight of 4-cyanobenzylamine were found as the impurities in the fraction.

Hydrogenation of terephthalonitrile was repeated in the same way as above-mentioned. After being freed from hydrogen, ammonia, catalyst, and toluene, the reaction mixture was added with 6 g. of an ethanol solution containing 2 percent by weight of sodium hydroxide, and heated at 75° C. for 90 minutes. After the removal of ethanol by distillation, the mixture was distilled under reduced pressure to obtain a clear fraction boiling at 148° to 149° C./14 mm.Hg. The fraction was analyzed by thin layer chromatography using ninhydrin. Neither terephthalonitrile nor 4-cyanobenzylamine was detected.

EXAMPLE 8

The hydrogenation procedure of Example 7 was repeated. After being freed from hydrogen, ammonia, catalyst, and toluene, the reaction mixture was added with 1 g. of a methanol solution containing 5 percent by weight of sodium methylate, and heated at about 65° C. for about 60 minutes. After the removal of ethanol by distillation, the mixture was distilled under reduced pressure to obtain 12.3 g. of a clear fraction boiling at 148° to 149° C./14 mm.Hg. The fraction was analyzed by thin layer chromatography using ninhydrin. Neither terephthalonitrile nor 4-cyanobenzylamine was detected.

EXAMPLE 9

The hydrogenation procedure of Example 7 was repeated. After being freed from hydrogen, ammonia, catalyst, and toluene, the reaction mixture was added with 0.05 g. of metallic magnesium suspended in 2 g. of benzyl alcohol, and heated at 130° C. for about 150 minutes. After the removal of benzyl alcohol by distillation under reduced pressure, the mixture was further distilled under reduced pressure to obtain 12.4 g. of a clear fraction boiling at 148° to 149° C./14 mm.Hg. The fraction was analyzed by thin layer chromatography. Neither terephthalonitrile nor 4-cyanobenzylamine was detected.

EXAMPLE 10

12.8 Grams of isophthalonitrile, 20 ml. of methanol, 20 ml. of liquid ammonia, 0.1 g. of sodium hydroxide, and 2 g. of Raney nickel were placed in a 100 ml. autoclave. After being charged with hydrogen to a pressure of 200 atm., the autoclave was shaken at 70° C. Upon completion of the absorption of hydrogen, which required 30 minutes, the autoclave was cooled to room temperature, and the pressure was released to purge off hydrogen and ammonia. After being freed from the Raney nickel, the reaction mixture was further heated at 65° C. for 120 minutes. The methanol was removed by distillation, and the mixture was distilled under reduced pressure, while being passed with a stream of nitrogen, to obtain a fraction boiling at 142° to 143° C./14 mm.Hg. The fraction was analyzed by gas chromatography, and 0.12 percent by weight of isophthalonitrile and 1.7 percent by weight of 3-cyanobenzylamine were found as the impurities in the fraction.

What is claimed is:

1. In a process for purifying a raw xylylenediamine obtained by the hydrogenation of a phthalonitrile following removal of unreacted hydrogen and any ammonia used as a reaction medium and separation of the catalyst to produce a reaction mixture containing xylylenediamine and at least one of unreacted phthalonitrile and intermediate cyanobenzylamine, the improvement comprising heating said reaction mixture in the presence of water or a monohydric alcohol after the addition of an alkaline agent selected from the group consisting of alkali metals, alkaline earth metals and the hydroxides, oxides, carbonates and alcoholates of alkali metals and of alkaline earth metals, and then distilling to recover a purified xylylenediamine from which the unreacted phthalonitrile and intermediate cyanobenzylamine are substantially completely removed.

2. A process according to claim 18, wherein the raw xylylenediamine is raw m-xylylenediamine and/or raw p-xylylenediamine.

3. A process according to claim 1, wherein the alkaline agent is at least one member selected from the group consisting of hydroxides, oxides, carbonates, and alcoholates of alkali metals and alkaline earth metals.

4. A process according to claim 1, wherein the monohydric alcohol is at least one member selected from the group consisting of monohydric lower aliphatic alcohols and monohydric aromatic alcohols.

5. A process according to claim 18, wherein the raw 1, is heated at a temperature of 65° to 180° C. for a period of 30 to 300 minutes.

6. A process according to claim 1 wherein the raw xylylenediamine is heated with exclusion of oxygen or air.

7. A process according to claim 1, wherein the alkaline agent is added in a proportion ranging from 0.1 to 5 gram-atoms, calculated on the basis of an alkali metal or an alkaline earth metal in the alkaline agent, for each gram-mole of the combined amount of a phthalonitrile and a cyanobenzylamine contained in the raw xylylenediamine.

8. A process according to claim 1, wherein the raw xylylenediamine is a reaction mixture containing at least one of (a) the unreacted phthalonitrile and (b) intermediate cyanobenzylamine and is obtained by removing unreacted hydrogen, reaction medium and catalyst from a reaction liquid obtained by hydrogenation of phthalonitrile.

9. A process according to claim 1, wherein the raw xylylenediamine is a partially purified xylylenediamine containing at least one of (a) unreacted phthalonitrile and (b) intermediate cyanobenzylamine and is obtained by partially purifying a reaction liquid resulting from the hydrogenation of phthalonitrile.

* * * * *